United States Patent [19]

Akita

[11] 4,254,485

[45] Mar. 3, 1981

[54] TEMPERATURE MEASURING APPARATUS WITH ALARM DEVICE

[75] Inventor: Sigeyuki Akita, Aichi, Japan

[73] Assignee: Nippon Soken, Inc., Nishio, Japan

[21] Appl. No.: 14,532

[22] Filed: Feb. 23, 1979

[30] Foreign Application Priority Data

Apr. 24, 1978 [JP] Japan ................................. 53-49096

[51] Int. Cl.³ .......................................... G01K 11/24
[52] U.S. Cl. .................... 367/117; 367/136; 73/339 A
[58] Field of Search ............... 367/117, 125, 129, 135, 367/136, 902; 73/339 A

[56] References Cited

U.S. PATENT DOCUMENTS 3,717,033 2/1973 Gordon et al. ..................... 73/339 A

FOREIGN PATENT DOCUMENTS 554892 3/1958 Canada ..................................... 367/136

Primary Examiner—Richard A. Farley
Attorney, Agent, or Firm—Cushman, Darby & Cushman

[57] ABSTRACT

A temperature measuring apparatus includes a transmitter for continuously transmitting an ultrasonic wave into a propagation medium the temperature of which is to be measured. Two receivers are located along an ultrasonic wave propagation path spaced from each other by a predetermined distance. A phase difference between the ultrasonic waves received by the two receivers is detected as a pulse width which varies depending on a propagation velocity of the wave and hence a temperature of the propagation medium. An obstacle detecting and alarming circuit is provided to detect the presence of an obstacle between the transmitter and the receivers by detecting the absence of the phase difference signal.

4 Claims, 12 Drawing Figures

TEMPERATURE MEASURING APPARATUS WITH ALARM DEVICE

BACKGROUND OF THE INVENTION

The present invention relates to a temperature measuring apparatus with alarm means which detects the temperature of a medium of propagation such as air by means of a change in the velocity of propagation of sound wave due to the temperature of the medium and which gives an alarm in response to the passage of a screening object such as a person.

SUMMARY OF THE INVENTION

It is the object of the present invention to provide a temperature measuring apparatus with alarm means comprising a single wave transmitter means and two wave receiver means which are placed in positions corresponding to the transmitter means at different predetermined distances therefrom, whereby a carrier wave or ultrasonic sound wave is always transmitted and received continuously between the wave transmitter and receiver means thus making it possible to always produce an output waveform of a constant level without being affected by the temperature of the air or the like and thereby making it possible to always stably and accurately detect changes in the velocity of propagation of sound wave to measure the temperature of a medium to be measured, making it possible to detect the temperature of the medium by means of the difference in phase between the pulse trains received by the two receiver means and thereby to detect the temperature of the medium disposed between the transmitter and receiver means irrespective of the distance of the medium or its distance from the transmitter and receiver means, respectively, and making it possible to detect the failure of the receiver means to receive the ultrasonic sound wave from the transmitter means due to the passage of a screening object such as dust or person between the transmitter and receiver means and thereby to warn this fact by means of a lamp, buzzer or the like and to store and display the then current temperature without the need to subject the same to error detection.

Thus, the apparatus of this invention has among its great advantages the fact that by installing the apparatus at the doorway of a room or the gateway of a house, it is possible to detect the going in and out of person or car and also to detect the temperature of the room, the exterior of the house or the like.

DESCRIPTION OF THE PREFERRED EMBODIMENT

Figure 1:
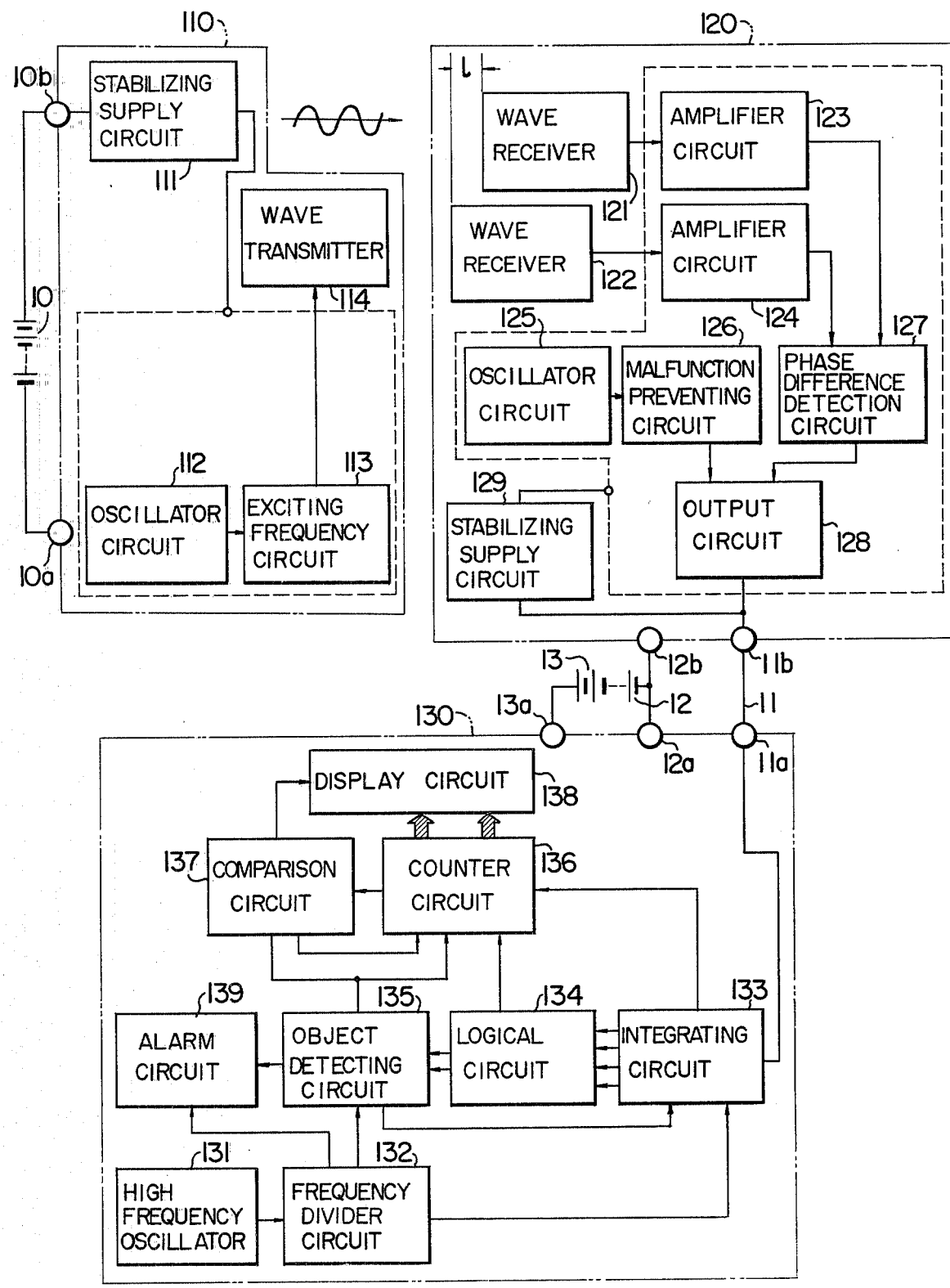
FIG. 1 is a block diagram showing the overall general construction of an embodiment of a temperature measuring apparatus with alarm means according to the invention.

The present invention will now be described with reference to the illustrated embodiment. Referring first to the block diagram of FIG. 1 showing the overall construction of the embodiment, block 110 designates a transmitting section including a wave transmitter, block 120 a receiving section including two wave receivers, and block 130 a display section which is connected to the receiving section 120 by a single signal line 11 and a ground wire 12. The signal line 11 serves the function of signal transmission and the function of supplying power to the receiving section. Numerals 10 and 13 designate power sources such as batteries, and the power sources 10 and 13 may be identical or different from each other.

Referring to the transmitting section 110, numeral 111 designates a stabilizing supply circuit, 112 an oscillator circuit adapted to oscillate at a predetermined frequency, 113 an exciting frequency circuit for producing from the oscillation signal of the oscillator circuit 112 a frequency for exciting a transmitting ultrasonic vibrator comprising a piezoelectric element or the like, 114 a wave transmitter.

Referring next to the receiving section 120, numerals 121 and 122 designate wave receivers for receiving an ultrasonic sound wave from the wave transmitter 114, and the receivers 121 and 122 are disposed at a predetermined distance l from each other in the receiving direction. Numerals 123 and 124 designate amplifier circuits for amplifying received signal, 125 an oscillator circuit adapted to oscillate at a predetermined frequency, 126 a malfunction preventing circuit, 127 a phase difference detection circuit for detecting the phase difference between the wave receivers 121 and 122, 128 an output circuit for delivering a phase difference signal onto the signal line 11, and 129 a stabilizing power supply for deriving an electric power from the signal line 11 to supply the power to the individual circuits in the receiving section 120.

Referring now to the display section 130, numeral 131 designates a high frequency oscillator adapted to oscillate at a predetermined frequency, 132 a frequency divider circuit for producing from the high frequency oscillation signal of the oscillator 131 a frequency which suits the apparatus, 133 an integrating circuit for integrating the phase difference signal from the receiving section 120, 134 a logical circuit for producing a storage signal and reset signal, 135 an object detecting circuit for detecting the presence of an obstruction object between the wave transmitter and receivers, 136 a counter circuit for counting unit pulses indicative of the integration of a predetermined number of phase difference pulses from the integrating circuit 133, 137 a comparison circuit for determining whether the temperature of a medium to be measured is positive or negative, 138 a display circuit for displaying the temperature of air, and 139 an alarm circuit for giving an alarm by a lamp, buzzer or the like in response to the presence of an obstruction or screening object.

Figure 2:
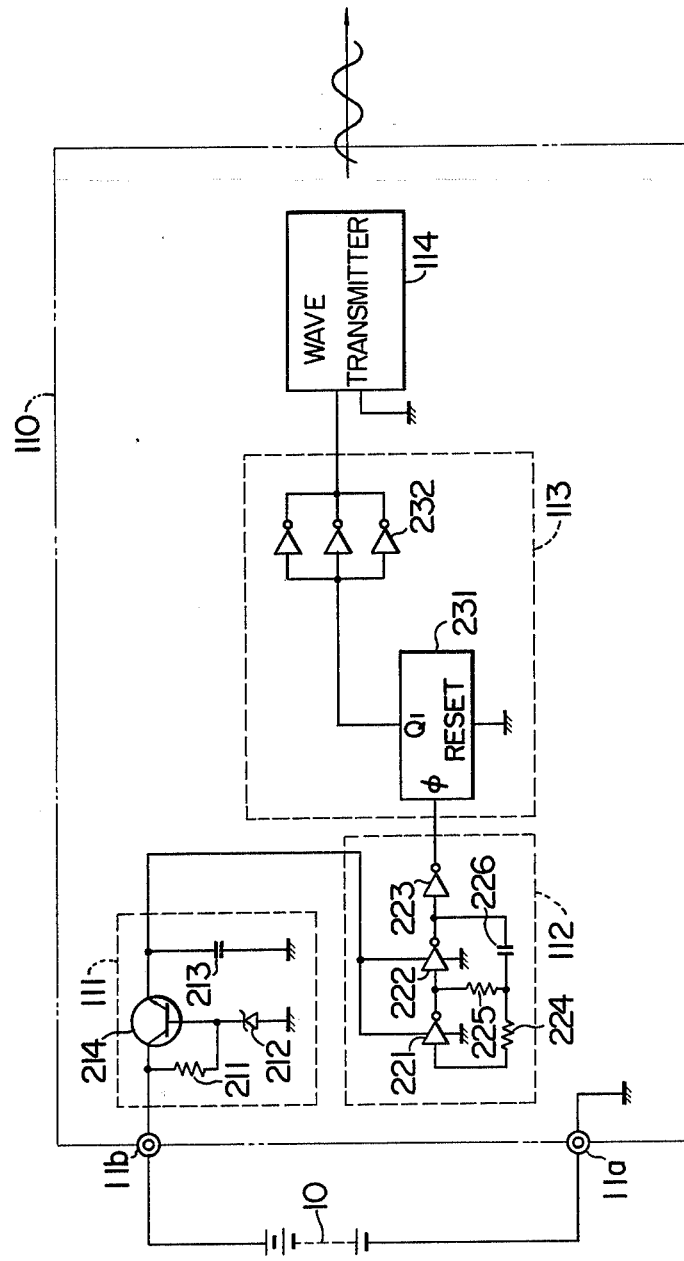
FIG. 2 is a wiring diagram showing a detailed circuit of the block 110 or the transmitting section shown in FIG. 1.

Next, the details and operation of the embodiment constructed as described above will be described first with reference to the wiring diagram of FIG. 2 showing the transmitting section of the apparatus. In the transmitting section 110 of FIG. 2, the stabilizing power supply 111 comprises a resistor 211, a Zener diode 212, a capacitor 213 and a transistor 214, and in this embodiment the stabiliizing power supply 111 produces an output voltage of 7 volts to supply power to the individual electronic parts in the transmitting section 110. The oscillator circuit 112 is a known type of CR oscillator circuit comprising inverter gates 221, 222 and 223, resistors 224 and 225 and a capacitor 226. The oscillator output signal is applied to a frequency divider 231 (e.g., the RCA CD4024) of the exciting frequency circuit 113 to generate at its output a signal having a frequency (40 KHz in this embodiment) for exciting the transmitting ultrasonic vibrator of the wave transmitter 114. The signal is applied to the input of three parallel connected inverters 232 and the signal is subjected to current amplification for driving the wave transmitter 114 so as to continuously generate an ultrasonic sound wave. Of course, the frequency of this ultrasonic sound wave is the same with the exciting signal frequency (40 KHz in this embodiment).

Figure 3:
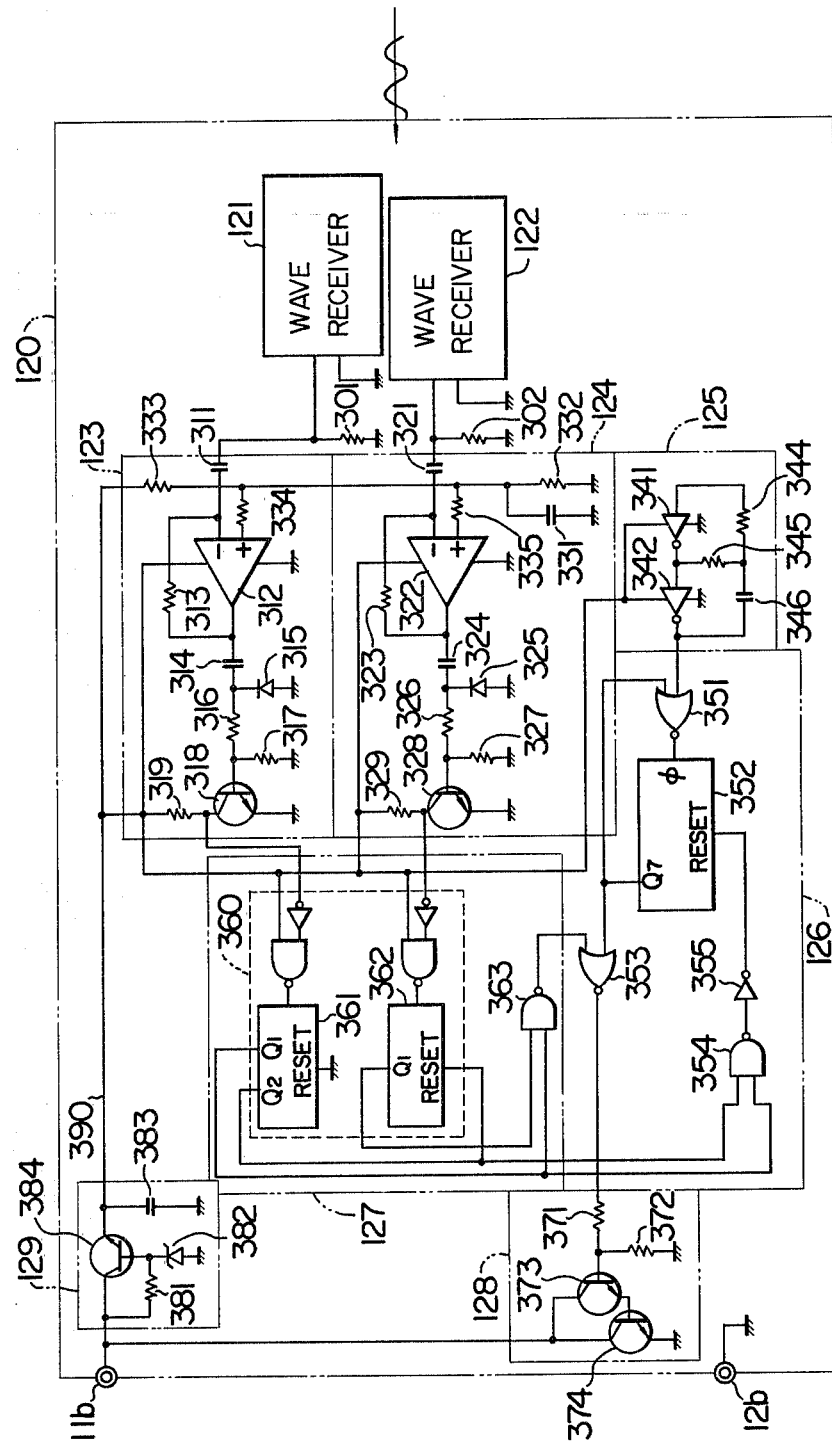
FIG. 3 is a wiring diagram showing a detailed circuit of the block 120 or the receiving section shown in FIG. 1.

Next, the receiving section 120 for receiving the ultrasonic sound wave from the wave transmitter 114 will be described with reference to the receiving section wiring diagram of FIG. 3. In the receiving section 120 of FIG. 3, the ultrasonic sound wave transmitted from the wave transmitter 114 is received by the first and second receivers 121 and 122 which are positioned at the predetermined distance l from each other in the same receiving direction, and the first receiver 121 generates at its output the signal shown in (411) of FIG. 4. In other words, the ultrasonic vibrator (e.g., a piezoelectric element) of the wave receiver generates a sinusoidal electromotive force when it is strained by vibrations of the air due to the ultrasonic sound wave. The signal 411 is applied to an amplifier 312 of the first amplifier circuit 123 through a capacitor 311 and the resulting amplifier output is reshaped by a transistor 318 thus generating the signal shown in (412) of FIG. 4. On the other hand, as shown in (421) of FIG. 4, the second wave receiver 122 generates at its output a received waveform which is different in phase from the received signal 411 of the first wave receiver 121. The signal 421 is applied to an amplifier 322 of the second amplifier circuit 124 through a capacitor 321 and the resulting amplifier output is reshaped by a transistor 328 thus generating the signal shown in (422) of FIG. 4.

The signals 412 and 422 or the received signals of the first and second wave receivers 121 and 122 are applied to a frequency divider circuit 360 of the phase difference detection circuit 127. The frequency divider circuit 360 has two independent frequency dividing functions and it may be comprised of the RCA CD4520. The received signal 412 is applied to the input of a first frequency divider 361 so that the signal shown in (413) of FIG. 4 which was divided by 2 is generated at its first-stage output and the signal shown in (414) of FIG. 4 which was divided by 4 was generated at its second-stage output. On the other hand, the received signal 422 is applied to the input of a second frequency divider 362 and the second-stage output signal 414 of the first frequency divider 361 is applied to the reset terminal of the second frequency divider 362, thus generating the signal shown in (423) of FIG. 4 at the first-stage output of the second frequency divider 362. The signal 423 and the first-stage output signal 413 of the first frequency divider 361 are applied to a NAND gate 363 and consequently a signal indicative of a phase difference $T_1$ between the received signals of the first and second wave receivers 121 and 122 is generated at the output of the NAND gate 363 as shown in (431) of FIG. 4.

Figure 5A:
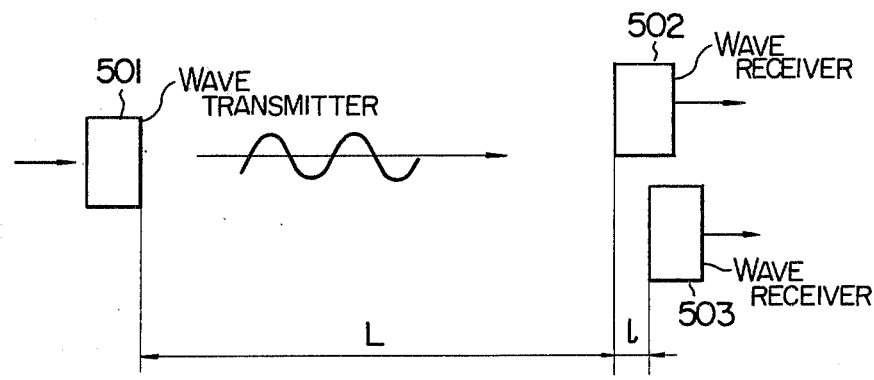
Figure 5B:
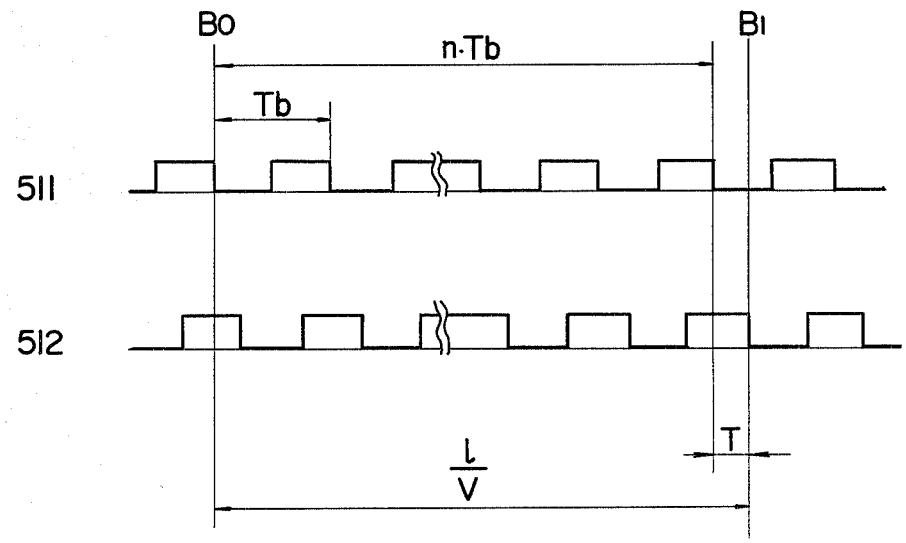

This phase difference will now be described in greater detail with reference to FIGS. 5A and 5B. In FIG. 5A, assuming now that with the distance between first and second wave receivers 502 and 503 being at l, the signal transmitted from a wave transmitter 501 is received at a time $B_0$ shown in (511) of FIG. 5B by the first wave receiver 502 and the same signal is received by the second wave receiver 503 at a time $B_1$, the required time t for propagation of the wave from the time $B_0$ to the time $B_1$ is given by $t=(l/V)$ (V is the velocity of sound). The carrier wave received by the first wave receiver 502 during the time t consists of n sound wave signals and consequently the phase difference T between the sound wave signals, particularly the pulse signal trains received by the first and second wave receivers 502 and 503 is given by $T=(l/V)n\cdot T_b$ (where $T_b$ is the period of pulse signals). It will be seen from the equation that the width of the phase difference varies depending on the sound velocity V or the air temperature.

Next, consider a case where the distance between the wave transmitter 501 and the first wave receiver 502 is L (where the distance L has a value which is very large as compared with the distance l). In this case, the time interval $t_1$ between the time that a sound wave is transmitted from the wave transmitter 501 and the time that the sound wave is received by the first wave receiver 502 is given by $t_1=(L/V)$, and the similar time $t_2$ required for the second wave receiver 503 to receive the sound wave is given by $t_2=(L+l)/V$. As a result, the time difference $t_0$ between the first and second wave receivers 502 and 503 is given by $t_0=L+l/V-(L/V)=l/V$, and it will thus be seen that the temperature of a medium between the wave transmitter 501 and the wave receivers 502 and 503 can be measured irrespective of the distance L between the wave transmitter 501 and the wave receiver 502.

Figure 4:
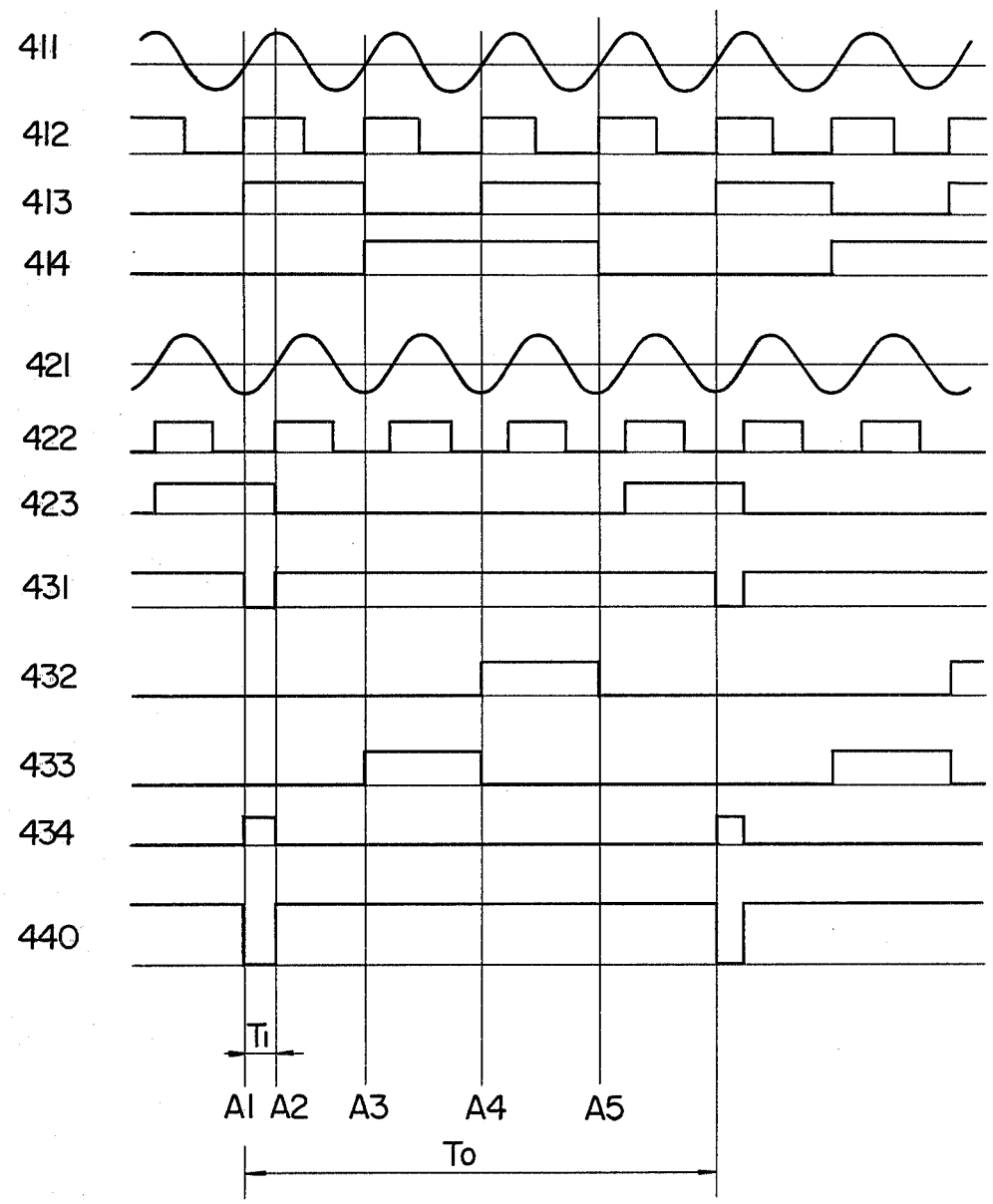
FIGS. 4 and 5A and 5B are respectively a signal waveform diagram and explanatory diagram useful for explaining the operation of the receiving section shown in FIG. 3.

Now the phase difference signal in (431) of FIG. 4 is to be directly transmitted to the display section 130 through the signal line 11, and in this case the phase difference signal 431 is applied to a NOR gate 353 of the malfunction preventing circuit 126 due to the fact that in this embodiment the signal line 11 serves the function of signal transmission as well as the function of power supply within the receiving section 120. On the other hand, the oscillation pulse signal from the oscillator circuit 125 comprising inverter gates 341 and 342, resistors 344 and 345 and a capacitor 346 is applied to a NOR gate 351 of the malfunction preventing circuit 126 and its output signal is divided by a frequency divider 352 thus generating a time signal. The signals 413 and 414 which were produced from the first received signal are subjected to a logical operation by a NAND gate 354 and its inverted signal or the signal shown in (432) of FIG. 4 is applied to the reset terminal of the frequency divider 352. As a result, the frequency divider 352 in its initial condition divides its input pulses so that when its nth-stage output (the 7th-stage output in this embodiment) goes to "1", the NOR gate 351 is closed and the frequency dividing operation is stopped. When the next reset signal 432 is applied, the frequency divider 352 is returned to the initial condition and the same operation as mentioned previously is effected again. Consequently, the malfunction preventing signal shown in (433) of FIG. 4 is generated at the nth-stage output of the frequency divider 352. In this case, the oscillation frequency of the oscillator circuit 125 or the number of divided output stages of the frequency divider 352 is so selected that the nth-stage output goes to "1" during the time interval between times $A_3$ and $A_4$ in FIG. 4 (in this embodiment the output goes to "1" at the time $A_3$).

The malfunction preventing signal 433 is applied to the NOR gate 353 so that the phase difference signal shown in (434) is generated at its output and the signal 434 drives transistors 373 and 374 in the output circuit 128. Consequently, a signal is generated at a terminal 11b which decreases to 0 volt only during the phase difference pulse width $T_1$ as shown in (440) of FIG. 4.

The malfunction preventing signal will now be described in some greater detail. Now consider a case where a screening object passes between the wave transmitter and the wave receivers. If the received signal waveforms of the wave receivers 121 and 122 are interrupted by chance by the screening object at any time during the time interval $A_1$ to $A_2$ in FIG. 4, the pulse signals are no longer applied to the inputs of the first and second frequency dividers 361 and 362 of the phase difference detecting circuit 127, and consequently the first-stage output of the first and second frequency dividers 361 and 362, respectively, remains in the "1" signal state. As a result, the output of the NAND gate 363 or the phase difference detection signal remains in the "0" signal state. When the output circuit 128 is actuated by this signal, the potential at the terminal 11b remains at 0 volt, so that it is no longer possible to supply power to the inner parts of the receiving section 120 and consequently the receiving section cannot be brought into operation even if the obstruction object is removed. As a result, with the apparatus of this invention the occurrence of this situation is prevented by causing the frequency divider 352 to generate the malfunction preventing signal shown in (433) of FIG. 4. In other words, even if the output of the NAND gate 363 is kept in the "0" state, the output signal of the frequency divider 352 goes to "1" at the time $A_3$ as shown in (433) of FIG. 4, with the result that even if the output of the NAND gate 363 is kept in the "0" state, the output signal of the NOR gate 363 goes to "0" at the time $A_3$ and the transistors in the output circuit 128 are turned off. Consequently, the terminal 11b decreases to the zero potential only during the time interval $A_1$ to $A_3$ even in the worst case and at any other time the terminal 11b remains at the power supply voltage of E volts (the automobile battery voltage of 12 volts in this embodiment. As a result, the supply of power to the inner parts of the receiving section 120 is always maintained by the stabilizing power supply which will be described later so that in response to the elimination of the obstruction object, the previously mentioned operation is effected and a phase difference signal is generated.

The signal shown in (440) of FIG. 4 and generated at the terminal 11b is applied to the stabilizing supply circuit 129 comprising a resistor 381, a Zener diode 382, a capacitor 383 and a transistor 384 and a DC voltage (7 volts in this embodiment) is produced to supply the required power to the inner electronic parts of the receiving section 120 as mentioned previously. In other words, the time width $T_0$ in (440) of FIG. 4 is very long as compared with the time width $T_1$ and consequently a power supply line 390 is prevented by the capacitor 383 from decreasing to the zero potential even if the terminal 11b is decreased to the zero potential.

The phase difference detection signal transmitted by way of the signal line 11 is applied to a terminal 11a of the display section 130.

The display section 130 will now be described in greater detail with reference to the wiring diagram of FIG. 6. When the phase difference detection signal shown in (701) of FIG. 7 (this signal is the same with the signal shown in (440) of FIG. 4 but increased in time width) is applied to the terminal 11a, the signal is applied to an inverter gate 631 of the integrating circuit 133 through a resistor 602 and the same signal as shown in (701) of FIG. 7 is generated at the output of the inverter gate 632. The signal 701 modulates the high frequency signal generated from the frequency divider circuit 132 and shown in (702) of FIG. 7 through a NOR gate 633, thus generating at its output the modulated pulse signal shown in (703) of FIG. 7 having the high frequency pulses superposed thereon in the time period $T_1$. In other words, it will be seen that the number of high frequency pulses generated during the time period $T_1$ varies when the phase difference $T_1$ varies with a change in the air temperature.

Figure 7:
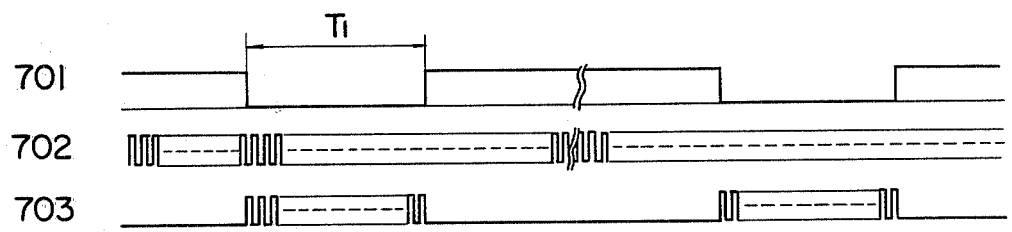
FIGS. 7, 8, 9, 10 and 11 are signal waveform diagrams useful for explaining the operation of the display section shown in FIG. 6.
Figure 8:
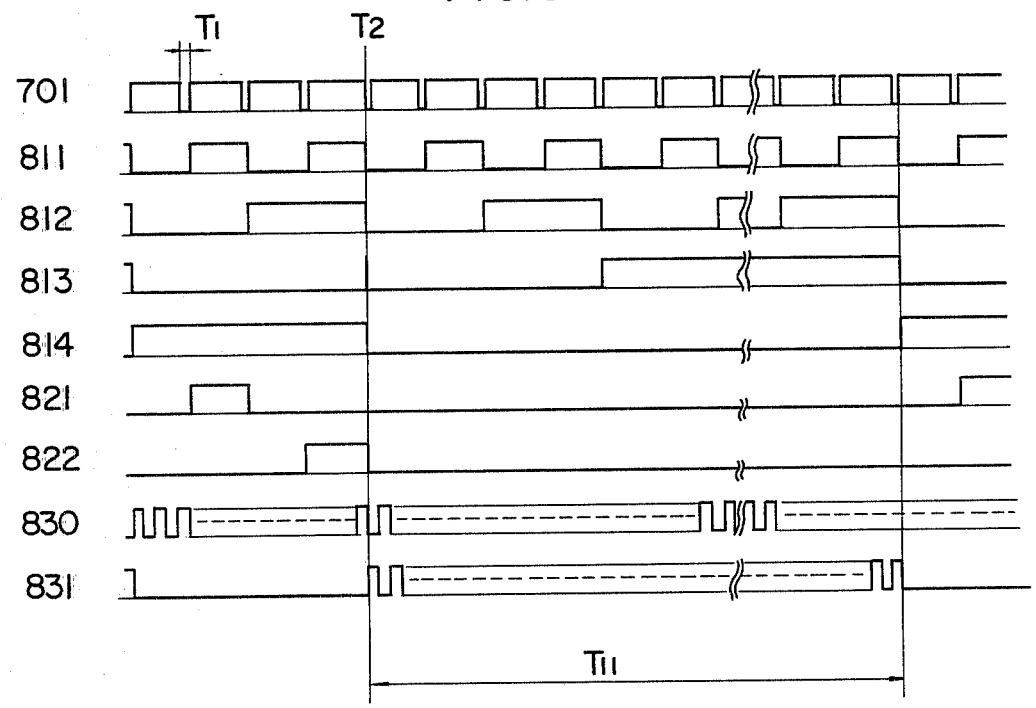

The output signal of the inverter gate 632 shown in (701) of FIG. 8 (the same signal as shown in (701) of FIG. 7) is applied to a counter 635, so that the counter 635 counts $2^m$ pulses ($2^{12}$ pulses in this embodiment) of the pulse signal 701 and it generates signals for a certain time. The resulting output signals respectively corresponding to the counting of $2^1$, $2^2$, $2^3$ and $2^m$ pulses are shown in (811), (812), (813) and (814) of FIG. 8. These signals are applied to the logical circuit 134 comprising inverter gates 641, 644 and 645 and NAND gates 642, 643, 646 and 647, so that the storage signal shown in (821) of FIG. 8 is generated at the output of the inverter gate 645 and the reset signal shown in (822) of FIG. 8 is generated at the output of the inverter gate 644. The storage signal 821 is applied to a NAND gate 654 of the object detecting circuit 135 which will be described later and the other input of the NAND gate 654 receives the phase difference signal 701 which always goes to "1" when there is no screening object between the wave transmitter and the wave receivers. As a result, the same signal as the storage signal 821 is generated at the output of an inverter gate 655 which inverted the output of the NAND gate 654. On the other hand, the output of the NAND gate 646 in the integrating circuit 134 goes to "0" at the instant that the output $Q_3$ of the counter 635 goes to "1" with its output $Q_m$ being at "1", and consequently the counters 635 and 634 are returned to the initial state in response to the application of "1" to their reset terminals through a NAND gate 647 to which "1" is applied as mentioned previously so long as the phase difference signal 701 is being applied. The previously mentioned output of the NOR gate 633 or the modulated pulse signal 703 is applied to the input of the counter 633 and consequently the signal shown in (830) of FIG. 8 is generated at the output $Q_{m-1}$ of the counter 634 representing the counting of $Q_{m-1}$ pulses. The integrated signal 830 and the $Q_m$ output signal of the counter 635 are applied to a NOR gate 636 which in turn generates at its output the signal shown in (831) of FIG. 8. It should be apparent that the number of pulses generated during the time period $T_{11}$ of FIG. 8 is equal to the average value of the number of pulses generated during the time period $T_1$ of the modulated pulse signal 703. In this case, however, the modulated pulse signal 703 is integrated for a certain time and the average value of the phase differences during the time is obtained.

The output signal 831 of the NOR gate 636 is applied to the clock terminal of an up/down counter 661 of the counter circuit 136 which may for example be a presettable up/down counter (e.g., the RCA CD4510B). The up/down counter 661 generates at its carry-out terminal a signal consisting of a single pulse in response to every ten pulses applied to the clock terminal. The carry-out output signals are applied to the clock terminal of the following up-down counter 662 so that the up/down counter 661 indicates the "ones" digit and the other counter 662 indicates the "tens" digit of a displayed number.

Assume now that the up/down counter 661 has its set inputs $P_1$, $P_2$, $P_3$ and $P_4$ preset altogether to "0" and the up/down counter 662 has its set inputs $P_1$, $P_2$ and $P_3$ preset to "0" and $P_4$ preset to "1" as in the present embodiment. In other words, if the preset input is 80, the output changes to 79, 78, 77, . . . in response to each of the pulses applied to the clock terminal of the up/down counter 661. As a result, when the reset signal shown in FIG. 8 is applied to the preset enable terminal of the up/down counters 661 and 662, respectively, the outputs $Q_1$, $Q_2$, $Q_3$ and $Q_4$ of the up/down counter 661 each generate a "0" signal and the outputs $Q_1$, $Q_2$, $Q_3$ and $Q_4$ of the up/down counter 662 each generates a "0" signal except the output $Q_4$ which generates a "1" signal. When the output signal 831 of the NOR gate 636 is applied to the clock terminal of the up/down counter 661, the outputs $Q_1$, $Q_2$, $Q_3$ and $Q_4$ of the up/down counter 661 change as shown in (911), (912), (913) and (914) of FIG. 9 and consequently the outputs $Q_1$, $Q_2$, $Q_3$ and $Q_4$ of the up/down counter 662 change as shown in (921), (922), (923) and (924) of FIG. 9 in response to the signal shown in (920) of FIG. 9 appearing at the carry-out terminal of the up/down counter 661.

Figure 9:
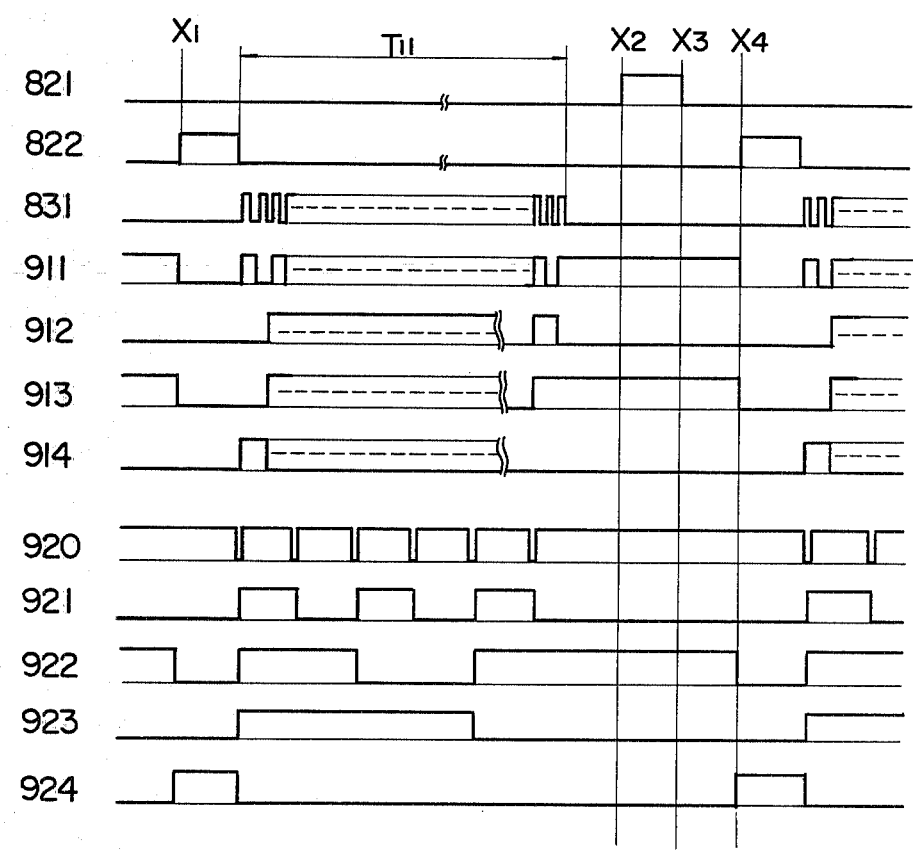

Assuming now that 55 pulses are generated during the time period $T_{11}$ shown in FIG. 9, the outputs $Q_1$, $Q_2$, $Q_3$ and $Q_4$ of the up/down counter 661 respectively go to "1", "0", "1" and "1" the outputs $Q_1$, $Q_2$, $Q_3$ and $Q_4$ of the up/down counter 662 respectively go to "0", "1", "0" and "0" so as to indicate the output during the period $X_2$ to $X_3$ or 80−55=25. These output signals are applied to circuits 663 and 664 for driving the display unit (comprising fluorescent readout tubes in this embodiment). Each of the driving circuits 663 and 664 may be comprised of the RCA CD4056. The outputs of the up/down counter 662 are applied to the circuit 664 through an inhibit circuit 666 (enclosed by a dotted line) comprising NOR gates and inverter gates, so that only when all the outputs of the up/down counter 662 are at "0", that is, when the "tens" digit of the display is zero the signals are inhibited, thus allowing only the "ones" digit of the display to be indicated.

On the other hand, the storage signal shown in (821) of FIG. 9 is applied to the drive circuits 663 and 664, respectively, so that when the storage signal goes to "1", the then current output states of the up/down counters 661 and 662 are stored and the display unit 138 indicates a number "25", thus indicating that the temperature of the medium to be measured or air is 25° C. When a time $X_4$ in FIG. 9 is reached, the up/down counters 661 and 662 are set to the initial states, so that the same operation as mentioned previously is effected in response to another input signal 831 and a display corresponding to the outputs of the drive circuits 663 and 664 is made. Assuming now that the temperature of the medium or air increases so that the phase difference width $T_1$ of the phase difference detection signal 434 of FIG. 4 decreases and the number of pulses generated during the time period $T_{11}$ of FIG. 9 decreases to 25, by the same operation as mentioned previously the outputs $Q_1$, $Q_2$, $Q_3$ and $Q_4$ of the up/down counter 661 respectively go to "1", "0", "1" and "0" and the outputs $Q_1$, $Q_2$, $Q_3$ and $Q_4$ of the up/down counter 662 respectively go to "1", "0", "1" and "0" so as to indicate the output during the time period $X_2$ to $X_3$ or 80−25=55 and consequently a number "55" is indicated on the display unit, thus indicating that the air temperature is 55° C.

Figure 10:
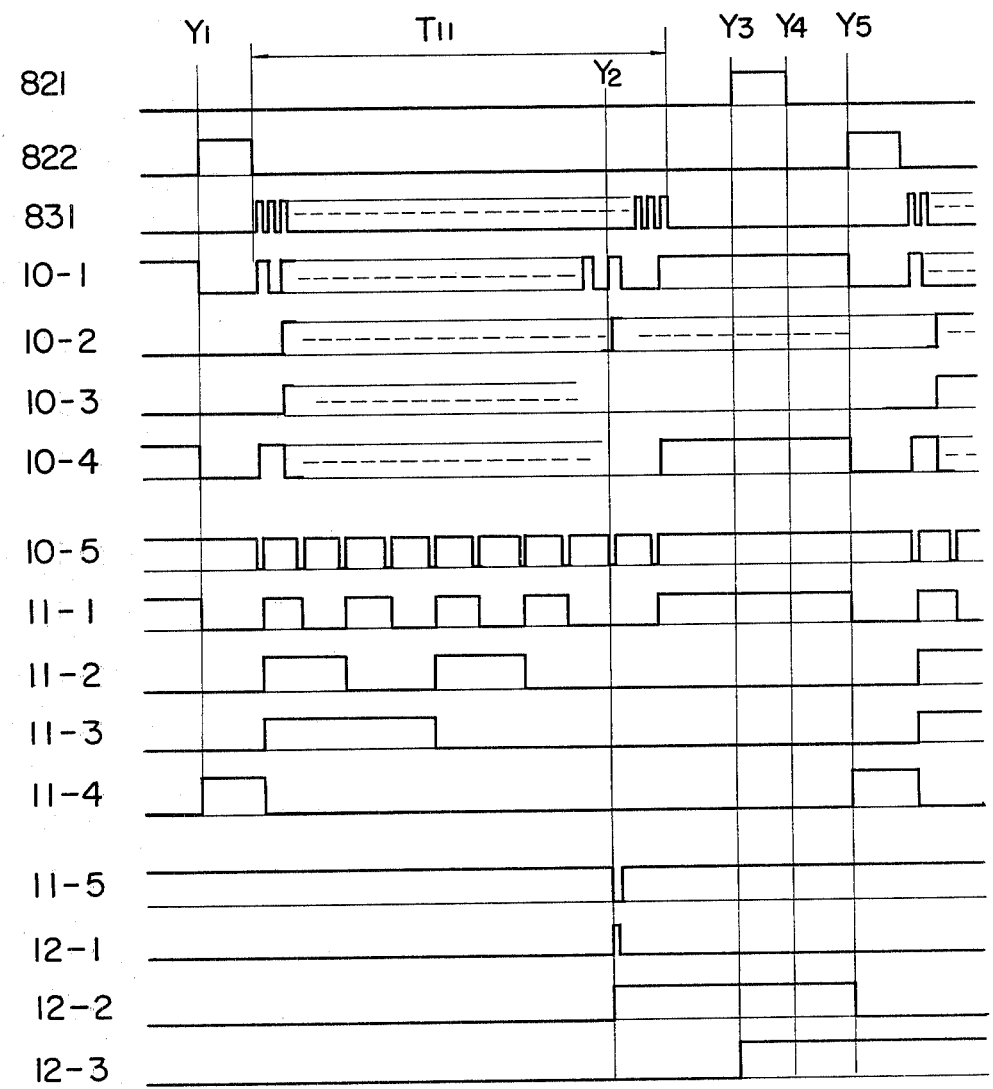

Next, consider a case where the temperature of the medium to be measured or air is decreased to a subzero temperature on the Celsius scale. It will be apparent that the phase difference width $T_1$ of the phase difference detection signal 434 of FIG. 4 is increased correspondingly. Thus let it be assumed that the number of pulses generated during the time period $T_{11}$ in (831) of FIG. 10 is 99. In the same manner as mentioned previously, the up/down counters 661 and 552 start to count down at a time $Y_1$ in FIG. 10 and consequently their outputs change as shown in (10-1), (10-2), (10-3), (10-4) and (10-5) and (11-1), (11-2), (11-3) and (11-4) of FIG. 10.

However, when 80 pulses have been applied to the clock terminal of the up/down counter 661 so that 80−80=0 at a time $Y_2$, the outputs of the up/down counters 661 and 662 all go to "0" and the signal shown in (11-5) of FIG. 10 is generated at the carry-out terminal of the up/down counter 662. The signal 11-5 and the output signal 10-5 from the carry-out of the up/down counter 661 are applied to a NOR gate 665 which in turn generates at its output a signal 12-1 which goes to "1" at the time $Y_2$. The signal 12-1 is applied to the clock terminal of a D-type flip-flop 671 in the comparison circuit 137 and consequently the output Q of the D-type flip-flop 671 generates a "1" signal at the time $Y_2$ as shown in (12-2) of FIG. 10. This "1" signal is applied to the up/down terminal of the up/down counters 661 and 662, respectively, and consequently the up/down counters 661 and 662 are set to start counting up at the time $Y_2$. Thus, from the time $Y_2$ on the output of the up/down counters 661 and 662, respectively, takes the form of a signal which increases in accordance with the number of input pulses. As a result, during the time interval between times $Y_3$ and $Y_4$ the outputs change to show 80−99=19, that is, the outputs $Q_1$, $Q_2$, $Q_3$ and $Q_4$ of the up/down counter 661 respectively go to "1," "0," "0" and "1" and the outputs $Q_1$, $Q_2$, $Q_3$ and $Q_4$ of the up/down counter 662 go to "1", "0", "0" and "0", respectively, thus causing the digits 19 to appear on the display unit 138. On the other hand, the output signal 12-2 of the D-type flip-flop 671 which went to "1" at the time $Y_2$ is applied to the D terminal of the following D-type flip-flop 672 and the storage signal 821 is also applied to its clock terminal, thus causing the D-type flip-flop 672 to generate at its output Q a signal 12-3 which goes to "1" at the time $Y_3$. The signal 12-3 drives a transistor 677 by way of an inverter gate 673 and thus the display unit 138 is caused to display a minus sign. As a result, a display of "−19" is provided on the display unit 138, thus indicating that the temperature of the medium to be measured or air is −19° C.

Figure 11:
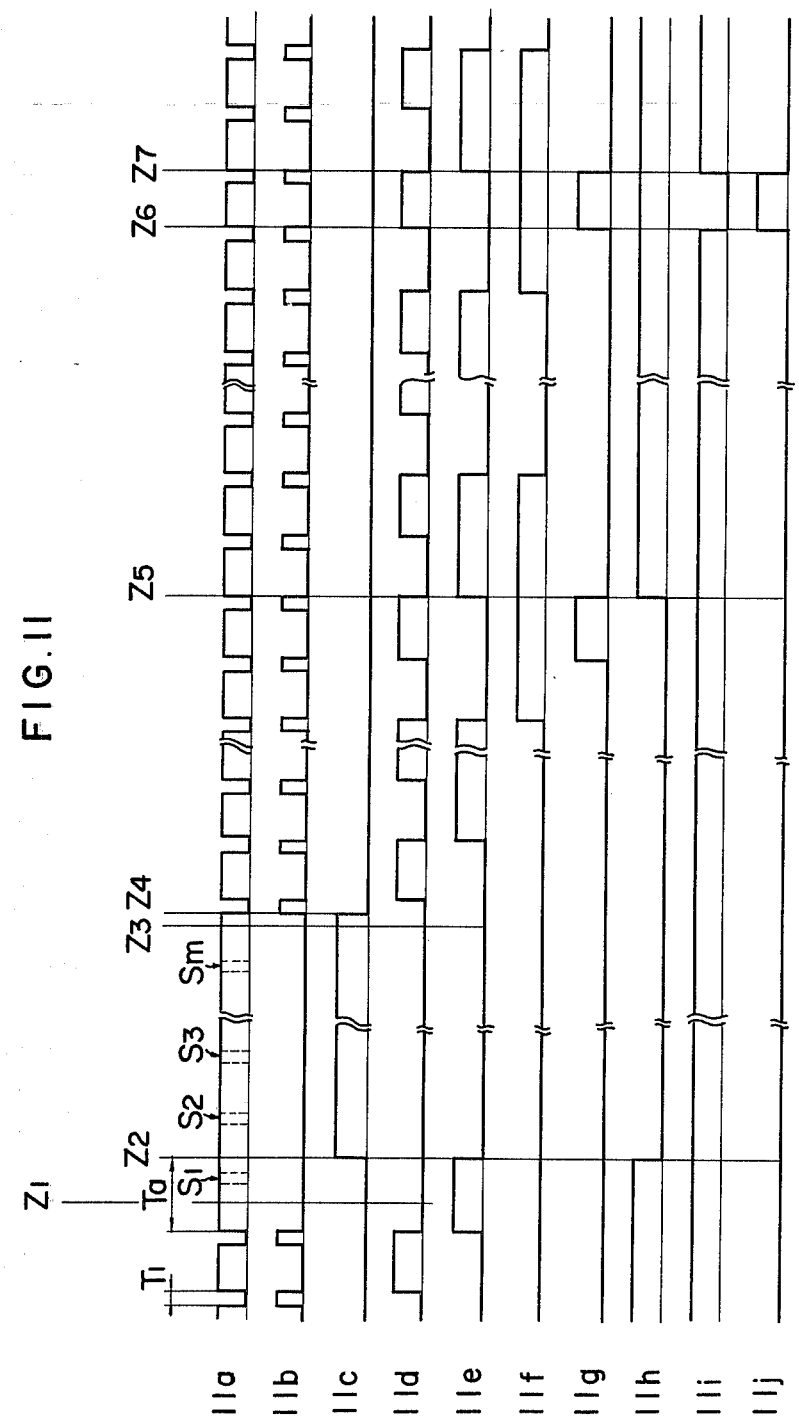

Next, the operation of the object detecting circuit 135 will be described with reference to a case where an obstruction object is present between the wave transmitter and the wave receivers. When an obstruction object comes between the wave transmitter and the wave receivers at a time $Z_1$ so that thereafter a signal of a phase difference pulse width $T_1$ is not applied to the terminal 11a of the display section 130 at times $S_1$ to $S_m$ as shown in (11a) of FIG. 11, the signal shown in (11b) of FIG. 11 is generated at the output of the inverter gate 631. The signal is then applied to the reset terminal of a counter 651 in the object detecting circuit 135. Due to the absence of the phase difference signal at the time $S_1$, the counter 651 is not reset so that the counter 651 counts the pulse signal applied through a NOR gate 652 from the frequency divider circuit 132 which divides the high frequency oscillation signal and consequently the counter 651 generates at its n th-stage output $Q_n$ (the seventh-stage output in this embodiment) the signal shown in (11c) of FIG. 11 which goes to "1" at a time $Z_2$. This "1" signal closes the NOR gate 652 to prevent the passage of the input pulses and consequently the signal at the output $Q_n$ of the counter 651 remains in the "1" state. The "1" signal 11c is applied to the reset terminal of a counter 657 and consequently the counter 657 is changed back to the initial condition. On the other hand, the "1" signal 11c is inverted by an inverter gate 653 and consequently the counters 635 and 634 are returned to their initial states through the NAND gate 647 of the integrating circuit 134.

Consequently, the outputs $Q_1$, $Q_2$ and $Q_m$ of the counter 635 shown in (11d), (11e) and (11f) of FIG. 11 and the output $Q_1$ of the counter 657 shown in (11h) of FIG. 11 all go to the "0" signal state at the time $Z_2$. The output $Q_1$ signal 11h of the counter 657 is applied to a NOR gate 659 and consequently the NOR gate 659 is opened to pass the pulse signal (of a frequency for driving a speaker that will be described later) applied to the other input of the NOR gate 659 from the frequency divider circuit 132. The resulting output signal drives a transistor 692 of the alarm circuit 139 and a speaker 693 is caused to sound to inform the presence of the obstruction object. On the other hand, the output signal 11h of the counter 657 is applied to the NAND gate 654 and consequently the output signal of the inverter gate 655 which inverts the output of the NAND gate 654 always goes to "0" as shown in (11j) of FIG. 11 so long as the obstruction object is present. Consequently, in the counter circuit 136 the circuits 663 and 664 for driving the display unit 138 continue to store the temperature measured just before the appearance of the obstruction object and this temperature is indicated on the display unit.

When the obstruction object is removed at the time $Z_3$ in FIG. 11 so that the ultrasonic sound wave transmitted from the wave transmitter 114 is received by the wave receivers 121 and 122, a phase difference signal again appears at the terminal 11a of the display section 130 from a time $Z_4$ on. This phase difference signal returns the counter 651 of the object detecting circuit 135 to the initial state, so that the output signal of the counter 651 goes to "0" at a time $Z_4$ as shown in (11c) of FIG. 11 and this "0" signal state is thereafter maintained so long as the phase difference signal is present. It will be apparent that the counters 634 and 635 of the integrating circuit 134 each counts again its input signal and the same operation as occurred in the presence of a phase difference signal again takes place. In other words, the signals shown in (11d), (11e) and (11f) of FIG. 11 respectively appear at the outputs $Q_1$, $Q_2$ and $Q_m$ of the counter 635 and these signals are subjected to a logical operation, thus generating at the output of an inverter gate 645 the storage signal shown in (11g) of FIG. 11 and identical with the signal shown in (821) of FIG. 8. The signal 11g is applied through a NAND gate 656 to the counter 657 which has been brought back into the counting operation. As a result, the counter 657 generates at its output $Q_1$ the signal shown in (11h) of FIG. 11 which goes to "1" at a time $Z_5$ and thereafter remains in the "1" state. The "1" signal 11h closes the NOR gate 659 and consequently the speaker no longer sounds, thus indicating the absence of any obstruction object. On the other hand, the output signal 11h of the counter 657 opens the NAND gate 654 to pass the storage signal 11g and thereafter the storage signal shown in (11j) of FIG. 11 is generated in the same manner as the previously mentioned operation in the presence of a phase difference signal.

While, in this embodiment, a storage signal is generated and the indication of temperature is effected again from the second cycle of the integrating circuit after the removal of the obstruction object or from the time $Z_6$ in FIG. 11 and on, this serves the following purpose. When the wave receivers 121 and 122 again receive the ultrasonic sound wave transmitted from the wave transmitter 114 upon removal of the obstruction object, the occurrence of a malfunction due to a change in the sound pressure level at the restart is prevented.

Figure 6:
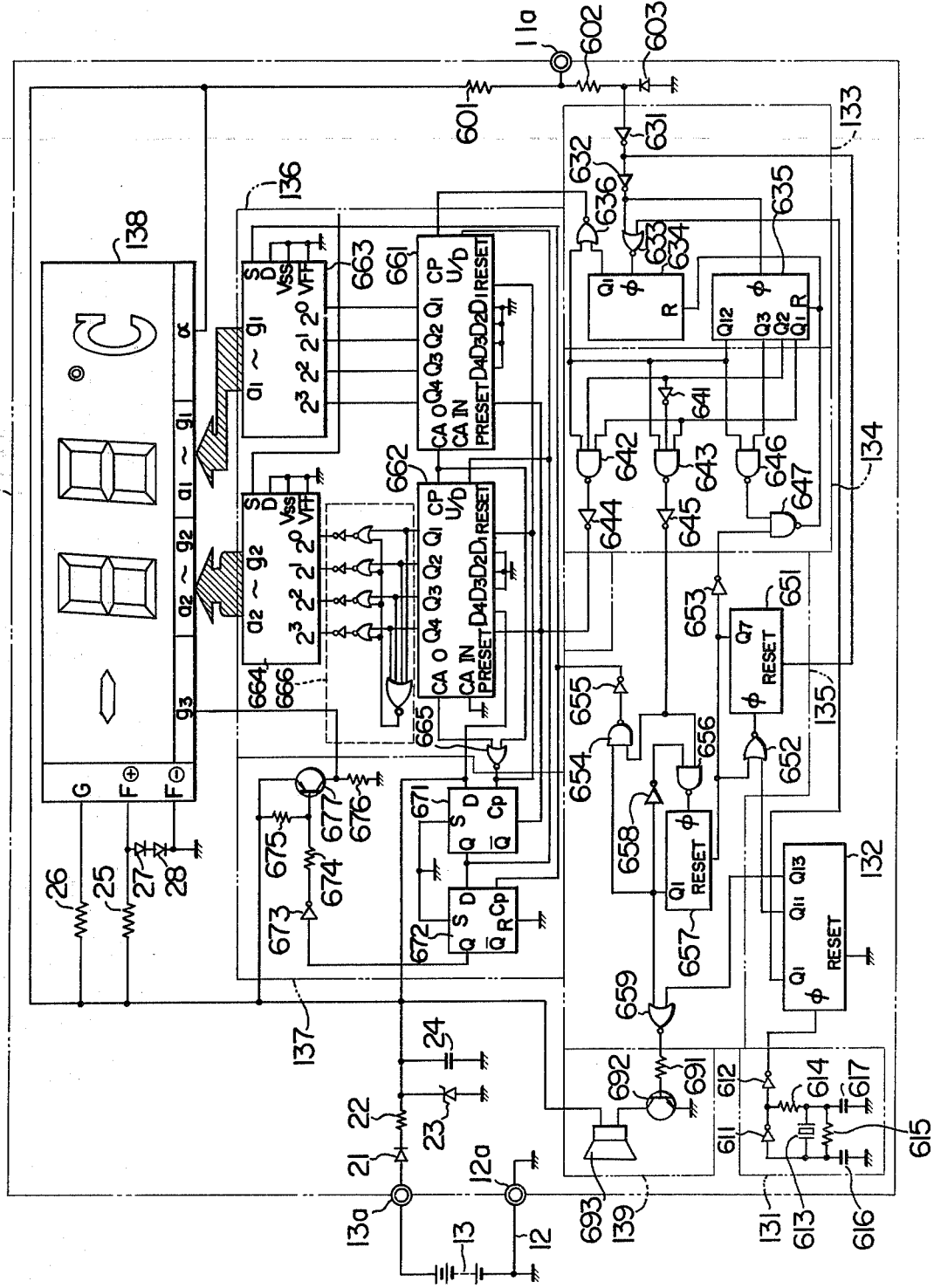
FIG. 6 is a wiring diagram showing a detailed circuit of the block 130 or the display section shown in FIG. 1.

In FIG. 6, diodes 21, 27 and 28, resistors 22, 25 and 26, a Zener diode 23 and a capacitor 24 are elements which are useful for protecting or assisting the operation of the entire circuitry and they will not be described in any detail.

While, in the present embodiment, an automobile battery is used for each power source, it is possible to use a dry battery of a DC voltage source provided by subjecting the domestic AC power supply to voltage conversion by a transformer and then to rectification. Alternatively, two differet types of power sources may be used, that is, in FIG. 1 the power source 10 may for example be comprised of a dry battery and the power source 13 may for example be a DC power supply produced from the domestic AC power supply.

Further, while, in the above described embodiment, the phase difference $T_1$ (FIG. 4(434)) betewen the first and second wave receivers 121 and 122 is utilized it is possible to utilize a pulse width $T_0$ obtained by subtracting the phase difference $T_1$ from one cycle period of a synchronous signal. In this case, the pulse width $T_0$ increases with an increase in the temperature in a manner reverse to that of the above-described embodiment. Thus, it should be apparent that it is possible to effect the same operation as the above-described embodiment by reversing the up-counting and down-counting operations of the up/down counters 661 and 662, respectively, and by setting the respective data inputs.

Further, while, in the embodiment, stable display is ensured by counting the number of modulated pulses, obtaining the average value of the number of modulated pulses in a fixed time and then supplying the resulting signal to the counter circuit 136 to drive the display circuit 138 to display the average value, it is possible to provide a display by applying the modulated pulses directly into the counter circuit 136 without the calculation of any average value.

Further, while, in the embodiment, the output of the counter circuit 136 is applied to the display circuit 138 to provide a digital display, the display circuit 138 may be replaced by a moving coil type ammeter or the like so as to provide an analog display.

Further, while, in the embodiment, a speaker is used to sound an alarm indicating the presence of an obstruction object, the speaker may be replaced with a lamp, buzzer or the like or alternatively the speaker may be used in combination with a lamp, buzzer or the like.

Further, while, in the embodiment, the output of the counter circuit 136 is utilized only for the displaying purposes, the invention is not intended to be limited thereto. For example, the counter output may be applied to any other electronic control device to use it as a temperature sensor, that is, the wave transmitter and the wave receivers may be attached to both sides of the gate of a house so as to detect the temperature of the open air and thereby to actuate the cooling and heating equipment inside the house in accordance with the detected temperature. In this case, the passage of any person, car or the like interrupts the ultrasonic sound wave between the wave transmitter and the wave receivers and consequently the apparatus of this invention sounds an alarm, thus making it possible to know the passage of persons, cars or the like from within the house.

We claim:

1. An apparatus for measuring a temperature of an ultrasonic sound wave propagation medium comprising:

transmitter means for transmitting an ultrasonic sound wave into an ultrasonic sound wave propagation medium;

first receiver means positioned along a sound propagation path in said propagation medium for receiving said ultrasonic sound wave transmitted from said transmitter means and synchronously producing a first electric signal indicative of a received ultrasonic sound wave;

second receiver means positioned along said sound propagation path in said propagation medium and distanced from said first receiver means for receiving said ultrasonic sound wave transmitted from said transmitter means and synchronously producing a second electric signal indicative of a received ultrasonic sound wave;

detector means for detecting a phase difference between said first and second electric signals produced respectively from said first and second receiver means and producing a pulse signal having a time interval equal to a detected phase difference;

resettable measuring means for measuring said time interval of said pulse signal produced from said detector means and providing an output indicative of a measured time interval; and indicator means for indicating a presence of an obstacle between said transmitter means and said first and second receiver means in response to an absence of said pulse signal produced from said detector means.

2. An apparatus according to claim 1, wherein said indicator means includes:

a counter adapted to be reset in response to said pulse signal produced from said detector means and to count clock pulses of a fixed frequency, said counter producing an output pulse when a count value reaches a predetermined value; and an indicator adapted to be operated in response to said output pulse produced from said first counter.

3. An apparatus according to claim 2, wherein said resettable measuring means includes:

a first counter for counting another clock pulses of another frequency during said time interval of said pulse signal produced from said detector means, said first counter means providing said output indicative of said measured time interval;

a second counter for counting said pulse signals produced from said detector means, said second counter producing an output pulse when a count value reaches another predetermined value; and a logic gate for resetting said first and second counters in response to said output pulses produced respectively from said counter of said indicator means and said second counter.

4. An apparatus according to claim 2 or 3 further comprising:

display means for displaying a temperature of said propagation medium in correspondence with said output produced from said measuring means, said display means keeping a temperature display unchanged in response to said output pulse produced from said counter of said indicator means.

* * * * *